(12) United States Patent
Tonn

(10) Patent No.: US 8,242,626 B1
(45) Date of Patent: Aug. 14, 2012

(54) MAGNETO-ELECTRIC METHOD AND APPARATUS FOR REMOTE POWERING ON THE HULL OF AN UNDERWATER VEHICLE

(75) Inventor: David A. Tonn, Charlestown, RI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 326 days.

(21) Appl. No.: 12/781,187

(22) Filed: May 17, 2010

(51) Int. Cl.
*B60L 1/00* (2006.01)
*B60L 3/00* (2006.01)
*H02G 3/00* (2006.01)

(52) U.S. Cl. ......... 307/9.1; 367/141; 367/131; 367/903; 333/177

(58) Field of Classification Search .................... 307/9.1
See application file for complete search history.

(56) References Cited

U.S. PATENT DOCUMENTS 7,170,821 B1 * 1/2007 Tonn et al. ............... 367/141
2003/0210110 A1 * 11/2003 Perreault et al. ......... 333/177
* cited by examiner

*Primary Examiner* — Rexford Barnie
*Assistant Examiner* — Toan Vu
(74) *Attorney, Agent, or Firm* — James M. Kasischke; Jean-Paul A. Nasser; Michael P. Stanley

(57) ABSTRACT

A remote power delivery system includes an electrically-conductive plate disposed adjacent to a sensor system of an underwater vehicle's hull. At least one toroidal coil is disposed between the plate and the face of the sensor system exposed to water. An AC voltage is applied to the plate so that a time-harmonic voltage is induced in each toroidal coil.

12 Claims, 1 Drawing Sheet

U.S. Patent    Aug. 14, 2012    US 8,242,626 B1 ered by AC source 30.

MAGNETO-ELECTRIC METHOD AND APPARATUS FOR REMOTE POWERING ON THE HULL OF AN UNDERWATER VEHICLE

STATEMENT OF GOVERNMENT INTEREST

The invention described herein may be manufactured and used by or for the Government of the United States of America for governmental purposes without the payment of any royalties thereon or therefore.

CROSS REFERENCE TO OTHER PATENT APPLICATIONS

None.

BACKGROUND OF THE INVENTION (1) Field of the Invention

The present invention relates generally to remote power delivery systems and methods, and more particularly to a remote power delivery system and method that supplies power to locations exterior to an underwater vehicle's hull.

(2) Description of the Prior Art

Currently, underwater vehicles have on-hull sensor arrays connected to the inboard side of the underwater vehicles by means of large, heavy expensive wiring harnesses. The sensors are embedded in a polymer material and are located several inches above the hull of the underwater vehicle. It would be desirable to deliver power to the sensor arrays without the use of large wiring harnesses in order to reduce costs and the overall weight of the system, and to improve reliability.

To address this problem, U.S. Pat. No. 7,170,821 discloses a method and apparatus for delivering power to a series of remote sensors in an on-hull sensor grid for the purpose of biasing the sensors' active circuitry. It requires no physical connection between the source of power and the sensor. It works by delivering electrical energy across the insulating gap that separates the sensor from the hull by means of a displacement current. In particular, the method and device include a conducting layer interposed between inner and outer layers and a ground plane interposed between a bonding layer and the inner layer. An application of alternating current to the ground plane will activate the conducting layer and provide power to the sensors at a location of the outer layer. The inner layer acts as a capacitor and the ground plane further provides an electrical path back to the hull. However, this approach requires the use of two conducting layers and electrical connection of all sensors to one of the conducting layers.

SUMMARY OF THE INVENTION

Accordingly, it is an object of the present invention to provide a remote power delivery system that can deliver power to a location that is on the exterior of a ship's hull.

Other objects and advantages of the present invention will become more obvious hereinafter in the specification and drawings.

In accordance with the present invention, a remote power delivery system includes an electrically-conductive plate disposed adjacent to a sensor system of an underwater vehicle's hull where a face of the sensor system is maintained in water. An alternating current (AC) source for generating an AC voltage is coupled to the plate and hull. At least one toroidal coil is disposed between the plate and the face of the sensor system. When AC voltage is applied to the plate, a time-harmonic voltage is induced in each toroidal coil.

BRIEF DESCRIPTION OF THE DRAWINGS

Other objects, features and advantages of the present invention will become apparent upon reference to the following description of the preferred embodiments and to the drawings, wherein corresponding reference characters indicate corresponding parts throughout the several views of the drawings and wherein.

DETAILED DESCRIPTION OF THE INVENTION

Figure 1:
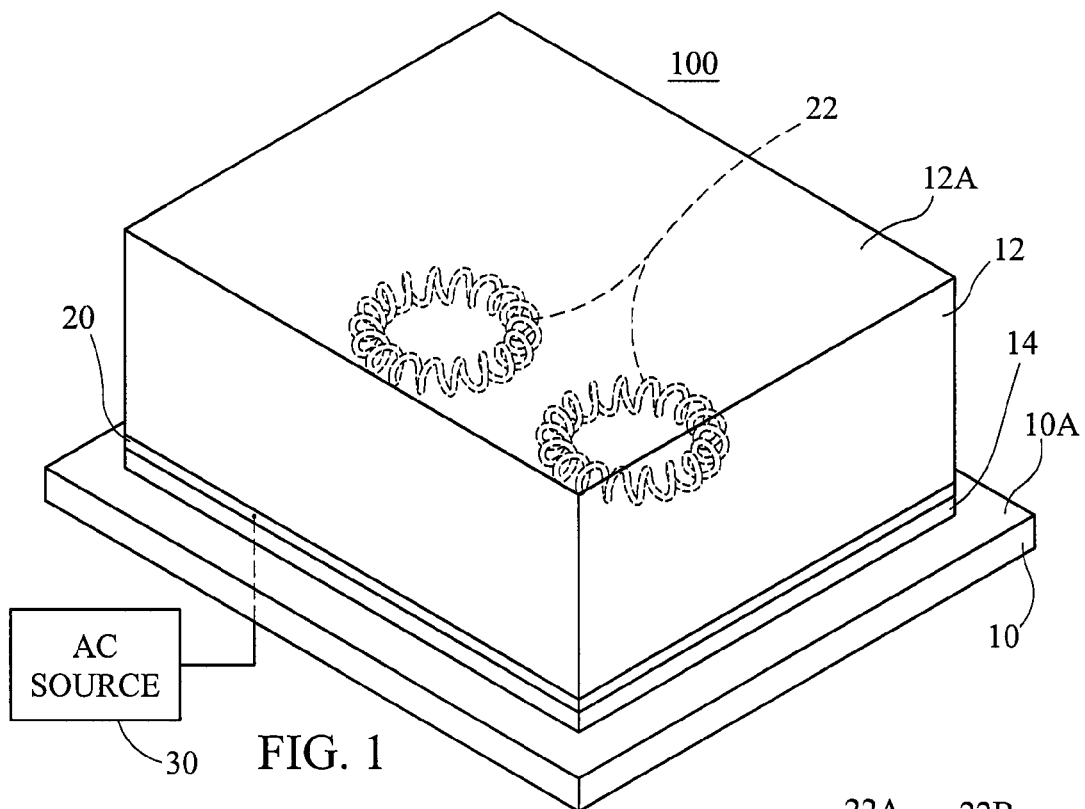
FIG. 1 is a schematic view of a remote power delivery system in accordance with an embodiment of the present invention.

Referring now to the drawings and more particularly to FIG. 1, a remote power delivery system in accordance with the present invention is incorporated in a sensor system typically found at the exterior of an underwater vehicle. In FIG. 1, a portion of a hull of an underwater vehicle is referenced by numeral 10 with 10A referencing an exterior region/face of hull 10. The underwater vehicle could be manned or unmanned without departing from the scope of the present invention.

Coupled to exterior region 10A is a sensor system used to house devices requiring electrical power such as acoustic or other sensors. As is known in the art, such sensor systems typically include one or more layers of polymer material(s) 12 bonded to exterior region 10A by a bonding layer 14. Polymer material(s) 12 are typically made from an elastomeric material that can also serve as a dielectric insulator. When hull 10 is under water 100, polymer material(s) 12 will reside under water 100 as illustrated.

In accordance with the present invention, an electrically-conductive material layer or plate 20 is disposed between bonding layer 14 and polymer material(s) 12. Plate 20 should be made of metal such as aluminum, copper, silver, or any other highly conductive material. Typically, plate 20 is approximately 1 millimeter thick. When hull 10 is under water 100, plate 20 and water 100 at the face of polymer material(s) 12 can be thought of as plates of a capacitor since water 100 is essentially at ground potential. Polymer material(s) 12 are the dielectric of the capacitor formed by water 100 and plate 20.

Disposed between plate 20 and face 12A of polymer material(s) 12 are one or more toroidal coils of wire 22. If polymer material(s) 12 are arranged in layers, coils 22 could be disposed between such layers with the particular placement and orientation of coils 22 being dictated by the particular application. If polymer material(s) 12 are monolithic, coils 22 could be cast therein during the manufacturing process.

An alternating current (AC) source 30 is coupled to plate 20 and hull 10. AC source 30 applies an AC voltage to plate 20. Since water 100 will contact at least some portion of hull 10 when under water 100, water 100 is effectively coupled to AC source 30 such that the capacitor defined by water 100, polymer material(s) 12, and plate 20 define a circuit element that is excited by AC source 30. When this capacitor is excited by an AC voltage, a time-harmonic electric field will be created in dielectric material(s) 12 and can be defined as $$\vec{E}(t) \approx \varepsilon_{eff}\varepsilon_0 \frac{V}{d}\cos(2\pi f t)\hat{z} \quad (1)$$

where $\varepsilon_{eff}$ is the effective relative permittivity of polymer material(s) 12, $\varepsilon_0$ is the permittivity of free space, f is the frequency in Hz, and $\hat{z}$ is a unit vector normal to plate 20.

According to the Maxwell equations, a time-harmonic, $\hat{z}$-directed electric field will give rise to a magnetic field that circulates around the lines of electric flux. Mathematically, this can be written as $$\oint_{\partial S}\vec{H}\cdot d\vec{L} = \varepsilon_{eff}\varepsilon_0\frac{\partial}{\partial t}\int\int_S \vec{E}(t)\cdot d\vec{S} \quad (2)$$

Here, "S" denotes any surface through which the electric field crosses, and ∂S is the perimeter of that surface. Assuming S to be a circle of radius r that is parallel to plate 20, the time-harmonic terms can be expressed as complex phasors $$2\pi r H_\varphi = \varepsilon_{eff}\varepsilon_0(j\omega)\frac{V}{d}(\pi r^2) \quad (3)$$

which reduces to $$H_\varphi = j\omega\varepsilon_{eff}\varepsilon_0 r\frac{V}{2d} \quad (4)$$

In accordance with Faraday's Law of induction, a time-varying magnetic field can produce a voltage. Under a quasi-static approximation, this voltage $V_{out}$ can be written as $$V_{out} = \oint_{\partial S'}\vec{E}\cdot d\vec{L'} = -\mu_0\frac{\partial}{\partial t}\oint\oint_{S'}\vec{H}\cdot d\vec{S'} \quad (5)$$

Since the magnetic field produced by the electric flux circulates in the φ direction, a toroidal coil of N turns (e.g., toroidal coil 22) can be used to enclose the circulating magnetic field. Assuming that the windings on the coil do not disturb the electric flux appreciably and that the toroid is parallel to plate 20, $V_{out}$ can be written as $$V_{out} = \frac{-\omega^2 r}{2c^2}\varepsilon_{eff}(N\pi a^2)\frac{V_{in}}{d} \quad (6)$$

where r is the mean radius of the toroidal coil, a is the radius of its cross-section, S', and c is the speed of light in vacuum.

This equation indicates that a time-harmonic voltage can be induced in a toroidal coil that is immersed in a time-harmonic electric flux. The voltage transfer ratio of $$\left|\frac{V_{out}}{V_{in}}\right| = \frac{N\pi\omega^2 r a^2}{2dc^2}\varepsilon_{eff} \quad (7)$$

indicates that the toroid size can be adjusted to suit the physical needs of the application. To keep the transfer ratio constant, changes in a and r can be compensated for by changing the number of turns N.

Figure 2:
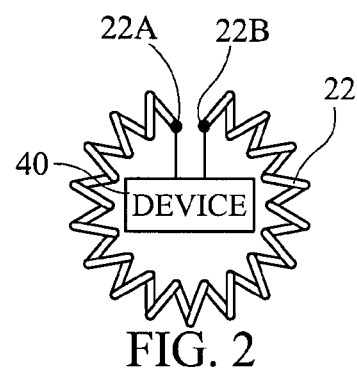
FIG. 2 is an isolated view of a toroidal coil surrounding a device to be powered in accordance with an embodiment of the present invention.

The voltage generated in each coil 22 can be tapped to supply one or more electrically-powered devices. For example, FIG. 2 illustrates one coil 22 with ends 22A and 22B of the coil being coupled to an electrical device 40 disposed within the volumetric confines defined by coil 22. Coil 22 is configured (e.g., mean radius, number of turns, etc.) to produce an induced AC voltage (as described above) to satisfy the power requirements of device 40. Device 40 can include a rectifier (not shown) if device 40 has DC operational requirements. The positioning of device 40 within the confines of coil 22 can be important depending on the nature of device 40. For example, if device 40 is an acoustic sensor, placing the sensor within the confines of coil 22 allows the combination of coil 22/device 40 to have rotational symmetry.

Figure 3:
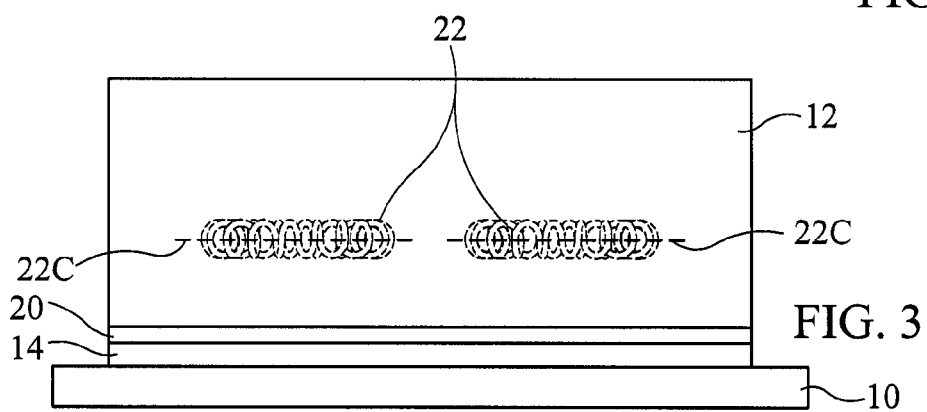
FIG. 3 is a side view of the remote power delivery system with the toroidal coils being substantially parallel to the power delivery system's conducting plate in accordance with an embodiment of the present invention.

The derivation of $V_{out}$ described above was based on the assumption that coil 22 was parallel (or approximately so) to plate 20. This relationship is illustrated in FIG. 3 where each coil 22 has a central circular axis (i.e., the axis circulating through the center of the windings defined by coil 22) that lies in a plane referenced by dashed line 22C. For maximum coupling efficiency, coils 22 are positioned such that plane 22C is approximately parallel to plate 20 as illustrated.

The advantages of the present invention are numerous. Electric power can be supplied to one or more devices that must be positioned on the exterior of an underwater vehicle's hull. The coil's symmetry is well suited to supplying power for an acoustic sensor that requires rotational symmetry in its installation configuration. No second conducting plate or ground bus is required as the system utilizes the seawater environment to form a grounded capacitor plate.

It will be understood that many additional changes in the details, materials, steps and arrangement of parts, which have been herein described and illustrated in order to explain the nature of the invention, may be made by those skilled in the art within the principle and scope of the invention as expressed in the appended claims.

What is claimed is:

1. A remote power delivery system for supplying power to a location exterior to an underwater vehicle's hull, comprising:
   a multi-layer sensor system adapted to be coupled to an exterior portion of an underwater vehicle's hull wherein a face of said sensor system is maintained in water;
   an electrically-conductive plate disposed adjacent to said system and located between the exterior portion of the hull and said face of said sensor system;
   an alternating current (AC) source for delivery an AC voltage, said AC source coupled to said plate and adapted to be coupled to the hull; and
   at least one toroidal coil disposed between layers of said sensor system wherein, when said AC voltage is applied to said plate, a time-harmonic voltage is induced in said at least one toroidal coil.

2. A remote power delivery system as in claim 1, wherein a circular central axis of each said toroidal coil lies in a plane that is approximately parallel to said plate.

3. A remote power delivery system as in claim 1, further comprising a device requiring power disposed within the confines of each said toroidal coil.

4. A remote power delivery system as in claim 3, wherein said device comprises an acoustic sensor.

5. A remote power delivery system for an underwater vehicle operating in a body of water, comprising:
- a sensor system adapted to be coupled to an exterior portion of the underwater vehicle's hull wherein a face of said sensor system is maintained in water when the underwater vehicle operates in the body of water;
- an electrically-conductive plate adjacent to said system wherein said plate and the water define capacitor plates with said sensor system defining a dielectric between said capacitor plates;
- an alternating current (AC) source for generating an AC voltage, said AC source coupled to said plate and adapted to be coupled to the hull; and
- at least one toroidal coil disposed within said sensor system wherein, when said AC voltage is applied to said plate, a time-harmonic voltage is induced in said at least one toroidal coil.

6. A remote power delivery system as in claim 5, wherein a circular central axis of each said toroidal coil lies in a plane that is approximately parallel to said plate.

7. A remote power delivery system as in claim 5, further comprising a device requiring power disposed within the confines of each said toroidal coil.

8. A remote power delivery system as in claim 7, wherein said device comprises a sensor.

9. A remote method of delivery power for use at a location at the exterior of an underwater vehicle's hull, comprising the steps of:
- coupling a sensor system to an exterior portion of the underwater vehicle's hull wherein a face of the sensor system is maintained in water when the underwater vehicle operates in a body of water;
- positioning an electrically-conductive plate adjacent to the sensor system and between the exterior portion of the hull and the face of the sensor system;
- disposing at least one toroidal coil within the sensor system;
- applying an AC voltage to the plate wherein a time-harmonic voltage is induced in each toroidal coil.

10. A method according to claim 9, wherein said step of disposing includes the step of positioning each toroidal coil such that a circular central axis thereof lies in a plane that is approximately parallel to the plate.

11. A method according to claim 9, further comprising the step of disposing a device requiring power within the confines of each toroidal coil.

12. A method according to claim 11, wherein the device is an acoustic sensor.

* * * * *